July 29, 1930.  I. F. KINNARD ET AL  1,771,930
ELECTRIC MEASURING INSTRUMENT
Filed Oct. 2, 1928
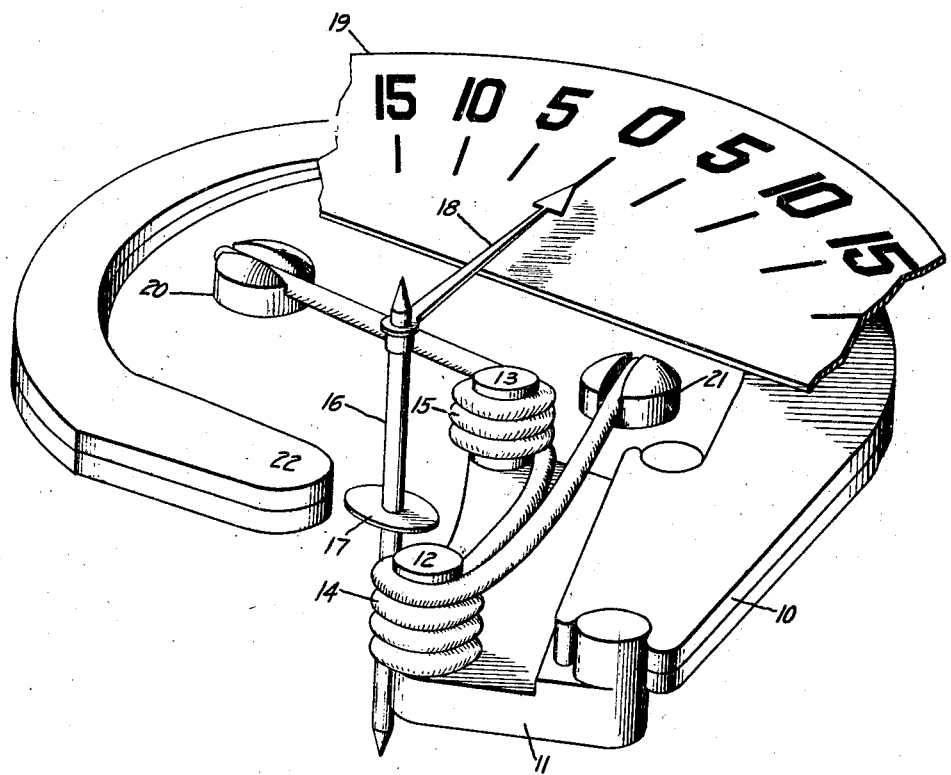
Inventors:
Isaac F. Kinnard,
Harold T. Faus,
by Charles V. Tullov
Their Attorney.

Patented July 29, 1930

1,771,930

UNITED STATES PATENT OFFICE

ISAAC F. KINNARD, OF LYNNFIELD, AND HAROLD T. FAUS, OF LYNN, MASSACHUSETTS, ASSIGNORS TO GENERAL ELECTRIC COMPANY, A CORPORATION OF NEW YORK

ELECTRIC MEASURING INSTRUMENT

Application filed October 2, 1928. Serial No. 309,719.

Our invention relates to electric measuring instruments and devices and its object is to provide an inexpensive rugged instrument of small dimensions suitable for general application and particularly for use on the instrument panel of automobiles for indicating the magnitude and direction of the battery current.

The instrument consists essentially of a permanent magnet provided with an air gap in which a magnetic vane armature is rotatably mounted. At least one of the pole pieces of the permanent magnet is provided with projections affording two paths for the magnetic flux which crosses the air gap through the magnetic vane. Coils are provided on these projections for selectively diverting the flux between these two paths in accordance with the direction and magnitude of the current to be measured. This diversion does not change the magnitude of the flux or the reluctance of the magnetic circuit. The magnetic vane is so mounted that its position is changed in accordance with such flux diversion. and in so doing it rotates a shaft on which the pointer of the instrument is mounted. The magnetic diverter is simply an electromagnet through the two limbs of which the permanent magnet flux flows in parallel and which when energized creates a magnetic potential difference causing the permanent magnet flux to be diverted.

The magnetic diverter and the magnetic vane are preferably made of materials having the characteristics necessary for continuous accuracy as will be hereinafter explained.

The features of our invention which are believed to be novel and patentable will be set forth in the claims appended hereto. The preferred embodiment of our invention is represented in perspective in the single figure of the drawing. It comprises a permanent magnet 10, the magnetic diverter pole piece 11 with its two auxiliary poles 12 and 13 and coils 14 and 15, the shaft 16 on which is mounted the magnetic vane 17 and pointer 18 and a stationary, zero center scale 19. Coils 14 and 15 are wound in opposite directions and are connected in series to the terminals of the instrument indicated at 20 and 21.

The vane 17 is mounted in the air gap of the permanent magnet between the rounded pole piece 22 and midway between the auxiliary pole pieces 12 and 13 of the magnetic diverter. The vane is about on a level with the tops of the pole pieces 12 and 13. When no current is flowing in coils 14 and 15 the flux of the permanent magnet is equally divided between the auxiliary poles 12 and 13 and both equally influence the magnet vane and hold it in the neutral position represented with the pointer on the central zero point of the scale. No return spring is required because the magnetic vane is always magnetized. When current flows in one direction through the circuit the permanent magnet flux is merely shifted from one auxiliary pole to the other to a greater or lesser extent, depending on the magnitude of the current and the vane 17 turns a corresponding amount toward that pole to which the permanent magnet flux is shifted. Thus, if both auxiliary poles are normally positive and current flows in a direction which tends to make pole 12 negative, pole 13 will become more strongly positive. The instrument will preferably read a maximum when the current reaches a value such that pole 12 becomes neutral or carries no flux and all of the flux of the permanent magnet flows from pole 13 across the air gap and magnetic vane to pole 22. When current flows in the opposite direction pole 12 becomes more strongly positive and 13 less so, until all the flux is diverted through pole 12. The electromagnetic diverter thus changes the angular direction of the permanent magnetic flux across the air gap without changing its value. We have found that the shape of the vane 17 and pole piece 22 and relative dimensions shown in the drawing produce the substantially uniform scale deflection represented. The reluctance of the flux path and the permanent magnet flux remains constant so that there is no tendency for the magnet to decrease in strength. Its flux is merely diverted through the parts 11, 12, 13 as explained above.

In order that no residual magnetic effects shall remain in the part 11, 12, 13 after a change in current, it is essential that the material of which this part is made shall have a negligible or zero hysteresis although it is essential that it be made of a material having good permeability at the flux densities to which it is subjected. If the material has appreciable hysteresis it will be reflected in erroneous instrument readings. The reading will be less than normal with rising currents and above normal for decreasing currents. Some of the copper-nickel-iron alloys have good permeability and negligible hysteresis loss and are suitable for use as the magnetic material of the pole piece 11, 12, 13. The alloys described in United States Patents 1,552,769, 1,582,353 and 1,622,008 will give very good results. We have also found that an alloy containing approximately 77% nickel, 8% copper and 14% iron gives excellent results. The nickel-iron alloy known in the trade as permalloy and described in United States Patent 1,586,883 will give fair results. Thus, while we do not wish to confine our invention to the use of any particular alloy or material at 11, it will be understood that this pole piece together with the auxiliary pole pieces 12 and 13 should be a magnetic material having low hysteresis loss if accurate results are to be obtained without using different calibrations for increasing and decreasing current values.

The magnetic vane 17 should preferably be made of such size and of a material that will saturate in the magnetic field produced by the permanent magnet so that there will be no tendency for it to alter the strength of the permanent magnet. It must also be of good magnetic material so as to aline itself with the major flux path across the air gap and preferably should be small in size so that it will be light in weight. The alloy materials previously referred to are suitable for this purpose and the permalloy material is the one which we prefer to use because of its extremely high permeability at low flux densities. We have found that rugged miniature instruments of high accuracy and reliability may be manufactured in accordance with this invention at low cost. The particular embodiment described is proportioned and arranged for a zero center scale such as is commonly employed in connection with storage battery systems. We do not wish to confine our invention to a zero center scale arrangement or to the exact spacing and arrangement of the magnetic diverter and magnetic vane illustrated. If the device is to be used merely as a directional relay it is not so important that the vane and diverter pole piece be made of special magnetic materials.

In accordance with the provisions of the patent statutes, we have described the principle of operation of our invention, together with the apparatus which we now consider to represent the best embodiment thereof, but we desire to have it understood that the apparatus shown and described is only illustrative and that the invention may be carried out by other means.

What we claim as new and desire to secure by Letters Patent of the United States, is:

1. An electric measuring device comprising a permanent magnet provided with main pole pieces separated by an air gap, a magnetic vane armature in said air gap, and an electromagnet integral with only one of said pole pieces producing a flux which does not cross the air gap for changing the angular direction of the permanent magnetic flux across said air gap without a change in the magnitude of such flux.

2. An electric measuring instrument comprising a permanent magnet provided with main pole pieces separated by an air gap, one of said pole pieces being provided with a magnetic member having negligible hysteresis, a winding on said last mentioned pole piece for altering the path of the permanent magnetic flux flowing therethrough and across the air gap, and a magnetic vane armature located in said air gap rotatably mounted to follow the alterations in the path of the flux across the air gap.

3. An electric measuring instrument comprising a permanent magnet having main pole pieces separated by an air gap, one of said main pole pieces being formed of a magnetic material of negligible hysteresis and shaped to form spaced apart auxiliary pole pieces, an energizing winding on said last mentioned main pole piece for creating a magnetic potential difference between the auxiliary pole pieces and to thus change the angular direction of the permanent magnet flux across said air gap, and a magnetic vane armature in said air gap rotatably mounted to follow the changes in the angular direction of and dimensioned to be saturated by the permanent magnet flux flowing across said air gap.

4. An electric measuring device comprising a permanent magnet having main pole pieces separated by an air gap, one of said main pole pieces constituting an electromagnetic diverter for changing the angular direction of the permanent magnet flux across said air gap, said diverter having auxiliary pole pieces adjacent said air gap through which the permanent magnet flux normally flows in parallel, an energizing winding on said diverter for creating a magnetic potential difference between said auxiliary pole pieces, and a magnetic vane armature located in said air gap arranged to be rotated in response to the change in angular direction of the flux across said air gap.

5. An electric measuring device comprising a permanent magnet having main pole pieces separated by an air gap, one main pole piece having spaced auxiliary pole pieces located substantially equally distant from the opposite main pole piece, a magnetic vane armature located in said air gap on an axis of rotation substantially equally distant from said auxiliary pole pieces, and a winding energized in response to a current to be measured for creating a magnetic potential difference between said auxiliary pole pieces.

In witness whereof, we have hereunto set our hands this 28th day of September, 1928.

ISAAC F. KINNARD.
HAROLD T. FAUS.